Patented May 20, 1930

1,758,936

UNITED STATES PATENT OFFICE

KARL DOBMAIER, OF LEVERKUSEN-ON-THE-RHINE, GERMANY, ASSIGNOR TO WINTHROP CHEMICAL COMPANY, INC., OF NEW YORK, N. Y., A CORPORATION OF NEW YORK

COMBATING AND EXTERMINATING OF VERMIN AND INSECT PESTS

No Drawing. Application filed February 16, 1928, Serial No. 254,898, and in Germany February 24, 1927.

The present invention relates to an agent for combating and exterminating of vermin and insect pests by means of molecular addition compounds of furfurol.

It is known that the insecticidal action of furfurol is due to the excellent wetting properties and the capacity of dissolving chitin and wax. The fact that furfurol is soluble only with difficulty has however hitherto prevented its general use and water soluble furfurol derivatives, such as for example furfurol bisulphite do not exert the desired and essential insecticidal effects.

In accordance with the present invention water-soluble molecular addition compounds of furfurol with basic compounds e. g. amines or aliphatic amino alcohols and derivatives thereof, or inorganic salts or mixtures of these compounds are found to be excellent means for the combating and extermination of vermin, insect eggs, larvæ, etc. and possess the great advantage of being miscible with water in all proportions, according to the nature of the molecular addition compound employed. Moreover, in addition to the solubility in water the compounds have the advantage of greater efficiency contrasted with furfurol itself. The molecular addition compounds of furfurol used for the purpose of my invention generally are prepared by causing the components to react upon each other in molecular quantities.

Thus, the solutions of the addition compounds of furfurol with ethylene-diamine, -triamine, pyridine, acet-aldehyde-ammonia, acetamide, amino-ethyl alcohol, diglycolimine and the like or also with inorganic salts, such as stannic chloride (compare Annalen der Chemie, vol. 376, page 297) and the like are miscible with water in all proportions.

The possibility of employing, instead of the pure amines, the crude products or mixtures as obtained in manufacture or such as are present in the residues from distillations, constitutes a considerably cheapening and simplification in regard to the production of means for combating and exterminating vermin and insect pests; moreover other known insecticides or like active materials can be added if desired.

My invention will be illustrated by the following examples without being limited thereto:—

*Example 1.*—An aqueous solution containing 10% of the furfurol-ethylene diamine molecular addition compound, to which a little resin soap has been added exerts a very strong insecticidal action in combating the grain weevil which offers an extraordinary resistance to such agents.

*Example 2.*—1 cc. of furfurol and 1 cc. of ethylamine are caused to form the molecular addition compound, 3 cc. of a 10% soap solution are added and the whole is diluted with water to 20 cc.

20 grain weevils were subjected to the solution with the result that after 2½ days 4 survived, which moreover were in a strongly narcotized state.

*Example 3.*—In an analogous manner a solution was prepared from 1 cc. of furfurol, ½ cc. of isobutylol, ½ cc. of ethylene diamine and 3 cc. of a 10% soap solution. 20 grain weevils were treated and all were killed.

I claim:—

1. As a new agent for combating and exterminating vermin and insect pests a water soluble molecular addition compound of furfurol.

2. As a new agent for combating and exterminating vermin and insect pests a water soluble molecular addition compound of furfurol with a compound of the group comprising amines and inorganic salts.

3. As a new agent for combating and exterminating vermin and insect pests a water soluble molecular addition compound of furfurol with ethylenediamine.

In testimony whereof I have hereunto set my hand.

KARL DOBMAIER.